(12) United States Patent
Hill

(10) Patent No.: US 7,081,664 B2
(45) Date of Patent: *Jul. 25, 2006

(54) DOPED SEMICONDUCTOR POWDER AND PREPARATION THEREOF

(75) Inventor: Steven E. Hill, Castle Rock, CO (US)

(73) Assignee: Group IV Semiconductor Inc., Ottawa (CA)

( * ) Notice: Subject to any disclaimer, the term of this patent is extended or adjusted under 35 U.S.C. 154(b) by 134 days.

This patent is subject to a terminal disclaimer.

(21) Appl. No.: 10/761,275

(22) Filed: Jan. 22, 2004

(65) Prior Publication Data

US 2004/0149353 A1     Aug. 5, 2004

Related U.S. Application Data

(60) Provisional application No. 60/441,413, filed on Jan. 22, 2003.

(51) Int. Cl.
*H01L 29/167* (2006.01)

(52) U.S. Cl. .................... 257/607; 257/611

(58) Field of Classification Search ............. 257/607, 257/611
See application file for complete search history.

(56) References Cited

U.S. PATENT DOCUMENTS

| | | | |
|---|---|---|---|
| 5,422,907 A | 6/1995 | Bhargava | |
| 5,434,878 A | 7/1995 | Lawandy | 372/43 |
| 5,637,258 A | 6/1997 | Goldburt et al. | |
| 5,646,425 A * | 7/1997 | Beach | 257/102 |
| 5,667,905 A | 9/1997 | Campisano et al. | |
| 6,255,669 B1 | 7/2001 | Birkhahn et al. | |
| 6,277,664 B1 * | 8/2001 | Lozykowski et al. | 438/22 |
| 6,294,401 B1 | 9/2001 | Jacobson et al. | 438/99 |
| 6,656,588 B1 * | 12/2003 | Laine et al. | 428/402 |
| 2002/0017657 A1 | 2/2002 | Coffa et al. | 257/200 |
| 2002/0048289 A1 | 4/2002 | Atanackovic et al. | |
| 2002/0070121 A1 | 6/2002 | Nayfeh et al. | 205/549 |
| 2002/0074565 A1 | 6/2002 | Flagan et al. | 257/200 |
| 2002/0163003 A1 | 11/2002 | Dal Negro et al. | 257/79 |
| 2003/0034486 A1 | 2/2003 | Korgel | |
| 2004/0183087 A1 | 9/2004 | Gardner | |

FOREIGN PATENT DOCUMENTS

| | | |
|---|---|---|
| DE | 101 04 193 | 8/2002 |
| EP | 0 650 200 | 4/1995 |
| EP | 1 134 799 | 9/2001 |
| JP | 2001 203382 | 7/2001 |

(Continued)

OTHER PUBLICATIONS

A. Nakajima, et al.; Microstructure and Optical Absorption Properties OS Si Nanocrystals Fabricated With Low-Pressure Chemical-Vapor Deposition; J. Appl. Phys., vol. 80, No. 7, Oct. 1, 1996, pp. 4006-4011.

(Continued)

*Primary Examiner*—Tuan H. Nguyen
(74) *Attorney, Agent, or Firm*—Allen, Dyer, Doppelt, Milbrath & Gilchrist, P.A.

(57) ABSTRACT

The invention provides a doped semiconductor powder comprising nanocrystals of a group IV semiconductor and a rare earth element, the rare earth element being dispersed on the surface of the group IV semiconductor nanocrystals. The invention also provides processes for the preparation of the above doped semiconductor powder, and a composite material comprising a matrix in which is dispersed a doped semiconductor powder.

16 Claims, 1 Drawing Sheet

FOREIGN PATENT DOCUMENTS

WO 2061815 1/2002
WO WO 02/061815 8/2002

OTHER PUBLICATIONS

Jeong Sook Ha, et al.; $Er^{3+}$ Photoluminescence From Er-Doped Amorphous $SiO_x$ Films Prepared by Pulsed Laser Deposition at Room Temperature: The Effects of Oxygen Concentration; Applied Physics Letters, vol. 82, No. 20, May 19, 2003, pp. 3436-3438.

Jung H. Shin, et al.; Effect of Hydrogenation on Room-Temperature 1.54 μm $Er^{3+}$ Photoluminescent Properties of Erbium-Doped Silicon-Rich Silicon Oxide; Applied Physics Letters, vol. 73, No. 25, Dec. 21, 1998, pp. 3647-3649.

T.G. Kim, et al.; Controlling the Formation of Luminescent Si Nanocrystals in Plasma-Enhanced Chemical Vapor Deposited Silicon-Rich Silicon Oxide Through Ion Irradiation; Journal of Applied Physics, vol. 91, No. 5, Mar. 1, 2002, pp. 3236-3242.

M. Li, et al.; Ellipsometry Investigation of Nucleation and Growth of Electron Cyclotron Resonance Plasma Deposited Silicon Films; J. Vac. Sci. Technol. A 11(4) Jul./Aug. 1993, pp. 1686-1691.

H.S. Bae, et al.; Electroluminescence Mechanism in $SiO_x$ Layers Containing Radiative Centers; Journal of Applied Physics, vol. 91, No. 7, Apr. 1, 2002, pp. 4078-4081.

Minoru Fujii, et al.; 1.54 μm Photoluminescence of $Er^{3+}$ Doped Into $SiO_2$ Films Containing Si Nanocrystals: Evidence for Energy Transfer From Si Nanocrystals to $Er^{3+}$; Appl. Phys. Lett. 71 (9), Sep. 1997, pp. 1198-1200.

Giorgia Franzò, et al.; Enhanced Rare Earth Luminescence in Silicon Nanocrystals; Materials Science and Engineering B69-70, 2000, pp. 335-339.

Giorgia Franzò, et al.; $Er^{3+}$ Ions-Si Nanocrystals Interactions and Their Effects on the Luminescence Properties; Applied Physics Letters, vol. 76, No. 16, Apr. 17, 2000, pp. 2167-2169.

Se-Young Seo, and Jung H. Shin; Exciton-Erbium Coupling and the Excitation Dynamics of $Er^{3+}$ in Erbium-Doped Silicon-Rich Silicon Oxide; Applied Physics Letters, vol. 78, No. 18, Apr. 30, 2001, pp. 2709-2711.

Jung H. Shin, et al.; Photoluminescence Excitation Spectroscopy of Erbium-Doped Silicon-Rich Silicon Oxide; Applied Physics Letters, vol. 76, No. 15, Apr. 10, 2000, pp. 1999-2001.

F. Iacona, et al.; Electroluminescence at 1.54 μm in Er-Doped Si Nanocluster-Based Devices; Applied Physics Letters, vol. 81, No. 17, Oct. 21, 2002, pp. 3242-3244.

Minoru Fujii, et al.; Photoluminescence From $SiO_2$ Films Containing Si Nanocrystals and Er: Effects of Nanocrystalline Size on the Photoluminescence Efficiency of $Er^{3+}$; Journal of Applied Physics, vol. 84, No. 8, Oct. 15, 1998, pp. 4525-4531.

A.J. Kenyon, et al.; Luminescence From Erbium-Doped Silicon Nanocrystals in Silica: Excitation Mechanisms; Journal of Applied Physics, vol. 91, No. 1, Jan. 1, 2002, pp. 367-374.

J. De la Torre, et al.; Optical and Electrical Transport Mechanisms in Si-Nanocrystal-Based LEDs; Elsevier Science B.V., Physica E, 2002, pp. 1-3.

Jung H. Shin, et al.; Composition Dependence of Room Temperature 1.54 μm $Er^{3+}$ Luminescence From Erbium-Doped Silicon: Oxygen Thin Films Deposited by Electron Cyclotron Resonance Plasma Enhanced Chemical Vapor Deposition; Applied Physics Letters, vol. 72, No. 9, Mar. 2, 1998, pp. 1092-1094.

P.G. Kik, et al.; Strong Exciton-Erbium Coupling in Si Nanocrystal-Doped $SiO_2$; Applied Physics Letters, vol. 76, No. 17, Apr. 24, 2000, pp. 2325-2327.

G. Franzò, et al.; Electroluminescence of Silicon Nanocrystals in MOS Structures; Appl. Phys. A, Materials Science & Processing, 74, (2002), pp. 1-5.

A. Irrera, et al.; Excitation and De-Excitation Properties of Silicon Quantrum Dots Under Electrical Pumping; Applied Physics Letters, vol. 81, No. 10, Sep. 2, 2002, pp. 1866-1868.

P.S. Andry, et al.; Growth of Er-Doped Silicon Using Metalorganics by Plasma-Enhanced Chemical Vapor Deposition; J. Appl. Phys. 80 (1), Jul. 1, 1996, pp. 551-558.

Kei Watanabe, et al.; Resonant Excitation of $Er^{3+}$ by the Energy Transfer From Si Nanocrystals; Journal of Applied Physics, vol. 90, No. 9, Nov. 1, 2001, pp. 4761-4767.

J. De la Torre, et al.; Optical Properties of Silicon Nanocrystal LEDs; Elsevier Science B.V., Physica E, 2002, pp. 326-330.

Orlov, L.K. et al., Comparitive Analysis of Light Emmitting Properties of Si:Er and $Ge/Si_{1-x}Ge_x$ Epitaxial Structures Obtained by MBE Method. *Gettering and Defect Engineering in Semiconductor Technology, Solid State Phenomena (Formerly Part B of Diffusion and Defect Data* [0377-6883]). vol. 69 until 70, 1999. pp. 377-382. ISSN:1012-0394.

Shin, J.H. et al., Controlling the Quantum Effects and Erbium-Carrier Interaction Using $Si/SiO_2$ Superlattices. *Proceedings of the SPIE.* vol. 4282, Jan. 1, 2001. Bellingham, VA United States of America. pp. 142-152.

Yun, F. et al., Room Temperature Single-Electron Narrow-Channel Memory With Siliconnanodots Embedded in $SiO_2$ Matrix. *Japanese Journal of Applied Physics.* Publication Office Japanese Journal of Applied Physics. vol. 39, No. 8A Part II. Aug. 1, 2000. Tokyo, Japan. pp. L792-L795.

Rozo, C. et al., Spectoscopic Study of Rare Earth Doped Nano-Crystalline Silicon in SiO2 Films. *Quantum Confined Semiconductor Nanostructures. Symposium (Mater. Res. Soc. Symposium Proceedings* vol. 737) Mater Res. Soc Warrendale, Pa, USA, 2003. pp. 517-522, XP 002310621. ISBN:1-55899-674-5.

Fujii, Minoru et al., Excitation of Intra-4f Shell Luminescence of $Yb^{3+}$ by Energy Transfer From Si Nanocrystals. *Applied Physics Letters.* American Institute of Physics. New York, USA. vol. 73, No. 21. Nov. 23, 1998, pp. 3108-3110, XP 012021485. ISSN: 0003-6951.

Pacifici, D. et al., Erbium-Doped Si Nanocrystals: Optical Properties and Electroluminescent Devices. *Physica E.* Elsevier netherlands, vol. 16, No. 3-4, Mar. 2003. pp. 331-340, XP 002310622. ISSN: 1386-9477.

\* cited by examiner

DOPED SEMICONDUCTOR POWDER AND PREPARATION THEREOF

CROSS-REFERENCE TO RELATED APPLICATIONS

This application claims benefit of U.S. Provisional Patent application Ser. No. 60/441,413, filed Jan. 22, 2003, entitled "PREPARATION OF TYPE IV SEMICONDUCTOR NANOCRYSTALS DOPED WITH RARE-EARTH IONS AND PRODUCT THEREOF", the contents of which are hereby incorporated by reference.

FIELD OF THE INVENTION

The present invention relates to a doled group IV semiconductor powder, to the preparation thereof, and to a material incorporating the group IV semiconductor powder.

BACKGROUND OF THE INVENTION

Silicon has been a dominant semiconductor material in the electronics industry, but it does have a disadvantage in that it has poor optical activity due to an indirect band gap. This poor optical activity has all but excluded silicon from the field of optoelectronics. In the past two decades there have been highly motivated attempts to develop a silicon-based light source that would allow one to combined an integrated digital information processing and an optical communications capability into a single silicon-based integrated structure. For a silicon-based light source (Silicon Light Emitting Diode (LED)) to be of any practical use, it should (1) emit at a technologically important wavelength, (2) achieve its functionality under practical conditions (e.g. temperature and pump power), and (3) offer competitive advantage over existing technologies.

One material that has gathered much international attention is erbium (Er) doped silicon (Si). The light emission from Er-doped Si occurs at the technological important 1.5 micron (μm) wavelength. Trivalent erbium in a proper host can have a fluorescence of 1540 nm due to the $^4I_{13/2} \rightarrow {}^4I_{15/2}$ intra-4f transition. This 1540 nm fluorescence occurs at the minimum absorption window of the silica-base telecommunication fibre optics field. There is great interest in Er doping of silicon as it holds the promise of silicon based optoelectronics from the marriage of the vast infrastructure and proven information processing capability of silicon integrated circuits with the optoelectronics industry. Theoretical and experimental results also suggest that Er in Si is Auger-excited via carriers, generated either electrically or optically, that are trapped at the Er-related defect sites and then recombine, and that this process can be very efficient due to strong carrier-Er interactions. However, if this strong carrier-Er interaction is attempted in Er-doped bulk Si, the efficiency of the $Er^{3+}$ luminescence is reduced at practical temperature and pump powers.

Recently, it has been demonstrated that using silicon-rich silicon oxide (SRSO), which consists of Si nanocrystals embedded in a $SiO_2$ (glass) matrix, reduces many of the problems associated with bulk Si and can have efficient room temperature $Er^{3+}$ luminescence. The Si nanocrystals act as classical sensitizer atoms that absorb incident photons and then transfer the energy to the $Er^{3+}$ ion, which then fluoresce at the 1.5 micron wavelength with the following significant differences. First, the absorption cross section of the Si nanocrystals is larger than that of the $Er^{3+}$ ions by more than 3 orders of magnitude. Second, as excitation occurs via Auger-type interaction between carriers in the Si nanocrystals and $Er^{3+}$ ions, incident photons need not be in resonance with one of the narrow absorption bands of $Er^{3+}$. However, existing approaches to developing such Si nanocrystals have only been successful at producing concentrations of up to 0.3 atomic percent of the rare earth element, which is not sufficient for practical applications.

In general, manufacture of type IV semiconductor nanocrystals doped with a rare earth element is done by ion implantation of silicon ions into a silicon oxide layer, followed by high temperature annealing to grow the silicon nanocrystals and to reduce the ion implantation damage. The implantation of Si ions is followed by an ion implantation of the rare earth ions into the annealed silicon nanocrystal oxide layer. The resulting layer is again annealed to reduce the ion implant damage and to optically activate the rare-earth ion.

There are several problems with this method: i) it results in a decreased layer surface uniformity clue to the ion implantation; ii) it requires an expensive ion implantation step; iii) it fails to achieve a uniform distribution of group IV semiconductor nanocrystals and rare-earth ions unless many implantation steps are carried out; and iv) it requires a balance between reducing the ion implant damage by thermal annealing while trying to maximise the optically active rare-earth.

To diminish the above drawbacks, Plasma Enhanced Chemical Vapor Deposition (PECVD) has been utilised to make type IV semiconductor nanocrystal layers. The prepared layers are then subjected to a rare-earth ion implantation step and a subsequent annealing cycle to form the IV semiconductor nanocrystals, and to optically activate the rare-earth ions that are doped in the nanocrystal region. Unfortunately, the layers prepared with this method are still subjected to an implantation step, which results in a decrease in surface uniformity.

Another PECVD method that has been used to obtain a doped type IV semiconductor crystal layer consists of co-sputtering together both the group IV semiconductor and rare-earth metal. In this method, the group IV semiconductor and a rare-earth metal are placed into a vacuum chamber and exposed to an Argon ion beam. The argon ion beam sputters off the group IV semiconductor and the rare-earth metal, both of which are deposited onto a silicon wafer. The film formed on the silicon wafer is then annealed to grow the nanocrystals and to optically activate the rare-earth ions. As the rare earth metal is in solid form, the argon ion beam (plasma) is only able to slowly erode the rare earth, which leads to a low concentration of rare earth metal in the deposited film. While higher plasma intensity could be used to more quickly erode the rare earth metal and increase the rare earth concentration in the film, a higher intensity plasma damages the film or the group IV semiconductor before it is deposited. The plasma intensity is therefore kept low to preserve the integrity of the film, therefore limiting the rare earth concentration in the film. The doped group IV semiconductor nanocrystal layers made through this method have the drawbacks that: i) the layer does not have a very uniform distribution of nanocrystals and rare-earth ions, ii) the layer suffers from upconversion efficiency losses due to rare-earth clustering in the film, and iii) the concentration of rare earth metal in the layer is limited by the plasma intensity, which is kept low to avoid damaging the layer.

The concentration of the rare earth element in semiconductor nanocrystal layers is preferably. As high as possible, as the level of photoelectric qualities of the film, such as photoluminescence, is proportional to tire concentration.

One problem encountered when a high concentration of rare earth element is present within the semiconductor layer is that when two rare earth metals come into close proximity with one another, a quenching relaxation interaction occurs that reduces the level of photoelectric dopant response observed. The concentration of rare earth element within a semiconductor film is thus balanced to be as high as possible to offer the most fluorescence, but low enough to limit the quenching interactions.

SUMMARY OF THE INVENTION

In one aspect, the present invention provides a doped semiconductor powder comprising nanocrystals of a group IV semiconductor and a rare earth element, the rare earth element being dispersed on the surface of the group IV semiconductor nanocrystals.

In another aspect, the present invention provides a process for preparing a doped semiconductor powder as described above, the process comprising:
  (a) heating a gaseous mixture comprising a gaseous group IV semiconductor precursor and a gaseous rare earth element complex at a temperature suitable for forming group IV semiconductor nanocrystals,
  (b) cooling the gaseous mixture to obtain the doped semiconductor powder.

In another aspect, the present invention provides process for preparing a doped semiconductor powder as described above, the process comprising:
  (a) mixing an undoped group IV semiconductor nanocrystal powder, a rare earth element complex and a solvent, the solvent being a good solvent for the rare earth element complex and a poor solvent for the undoped group IV semiconductor nanocrystal powder, to form a heterogeneous mixture,
  (b) heating the heterogeneous mixture to dissolve the rare earth complex in the solvent, and
  (c) cooling the heterogeneous mixture to obtain the doped semiconductor powder.

In another aspect, the present invention provides a composite material comprising a support matrix, in which support matrix is dispersed a doped semiconductor powder as described above.

The above and other objects, features and advantages of the present invention will become apparent from the following description when taken in conjunction with the accompanying figure which illustrates a preferred embodiment of the present invention by way of example.

DESCRIPTION OF THE FIGURES

Embodiments of the invention will be discussed with reference to FIG. 1.

DETAILED DESCRIPTION OF THE PREFERRED EMBODIMENTS

Figure 1:
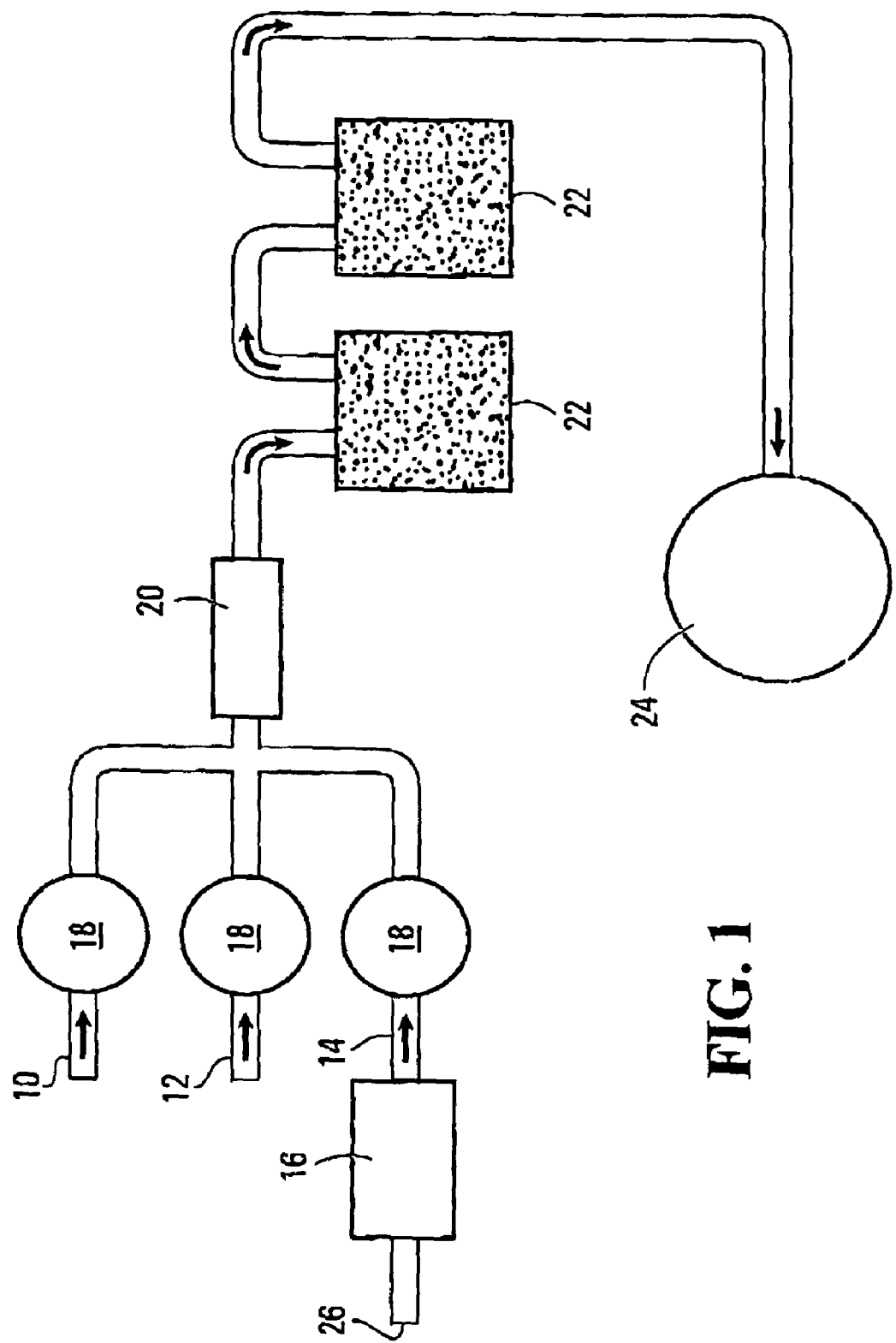
FIG. 1 displays a schematic of a gas pyrolysis apparatus suitable for the production of a group IV semiconductor powder doped with a rare earth element.

The present invention teaches the simple manufacturing of a doped semiconductor powder, which semiconductor powder comprises nanocrystals of a group IV semiconductor and a rare earth element.

The doped semiconductor powder comprises as a major component nanocrystals of a group IV semiconductor. The group IV semiconductor can be selected, e.g., from silicon, germanium, tin or lead, of which silicon and germanium are preferred. Combinations of these semiconductors can also be used, as well as multi-element semiconductors that comprise the above semiconductors. Preferably, the nanocrystals have an average diameter of from 0.5 to 10 nm, for example of about 3 nm.

The rare earth element that is dispersed on the surface of the semiconductor nanocrystals is preferably selected from cerium, praseodymium, neodymium, promethium, gadolinium, erbium, thulium, ytterbium, samarium, dysprosium, terbium, europium, holmium, lutetium, and thorium, of which erbium, thulium and europium are most preferred. The rare earth element is preferably in the form of a complex comprising a rare earth and one or more ligands. The nature of the one or more ligands is dictated by the process used to prepare the doped semiconductor powder. The doped semiconductor powders of the invention can also comprise more than a single rare earth element.

Since the rare earth element is dispersed on the surface of the group IV semiconductor nanocrystal, reduced photoactivity due to aggregation of the rare earth element is reduced. The concentration of the rare earth element in the doped semiconductor powder is preferably from 0.5 to 10 atomic percent, more preferably from 0.5 to 5 atomic percent, and most preferably from 0.5 to 2 atomic percent. The atomic percent values are calculated on the basis of the number of rare earth atoms relative the total number of atoms in the doped semiconductor powder.

Gas Pyrolysis

A gas pyrolysis process can be utilised to prepare the doped semiconductor powder of the invention. In this process, a group IV semiconductor precursor and a rare cartel element complex are mixed in the gaseous phase, and the mixture is first heated, and then cooled to obtain the desired product. The gas pyrolysis reaction consists of the thermal treatment of a gaseous group IV element, in the presence of a gaseous rare earth element, to such a temperature that the gaseous group IV element forms a nanocrystal. When the formed nanocrystal is cooled down in the presence of a rare earth element, the rare earth element goes form the gaseous state to the solid state and it deposits itself on the surface of the nanocrystal.

Gas pyrolysis can be carried out, for example, in a gas pyrolysis apparatus, a schematic of which is; provided in FIG. 1. In the apparatus shown in FIG. 1, a, carrier gas, a gaseous group IV semiconductor precursor and a gaseous rare earth element complex are introduced via entry ports 10, 12 and 14. The carrier gas is preferably an inert gas, such as argon.

As the group IV semiconductor is in the gaseous phase during reaction, a group IV semiconductor precursor is used. The group IV semiconductor precursor is chosen so that the precursor is volatile at room temperature, or so that it can be volatilized at a fairly low temperature, e.g., from 80 to 120° C. Preferably, the group IV semiconductor precursor is selected so that the by-products obtained after nanocrystal formation are themselves volatile compounds that will be removed with the gas flow. The group IV semiconductor is preferably selected from silicon, germanium, tin or lead, of which silicon and germanium are preferred. The precursor is preferably a hydride of the above elements. A particularly preferred group IV semiconductor precursor is silane ($SiH_4$).

Similarly, as the rare earth element as in the gaseous phase during reaction, a rare earth element complex that is volatile or that can be volatilized is used. The rare earth element complex comprises one or more ligands, which ligands can be neutral, monovalent, divalent or trivalent. Preferably, the ligand is selected so that when it is coordinated with the rare earth element, it provides a compound that is volatile, i.e. that enters the gaseous phase at a fairly low temperature, and without changing the chemical nature of the compound. Suitable ligands for the rare earth element complex include acetate functions, for example 2,2,6,6-tetramethyl-3,5-heptanedione, acetylacetonate, flurolacetonate, 6,6,7,7,8,8,8-heptafluoro-2,2-dimethyl-3,5-octanedione, i-propylcyclopentadienyl, cyclopentadienyl, and n-butylcyclopentadienyl. Preferred rare earth element complex include tris(2,2,6,6-tetramethyl-3,5-heptanedionato) erbium(III), erbium (III) acetylacetonate hydrate, erbium (III) flurolacetonate, tris(6,6,7,7,8,8-heptafluoro-2,2-dimethyl-3,5-octanedionate)erbium (III), tris(i-propylcyclopentadienyl)erbium (III), Tris(cyclopentadienyl)erbium (III), and tris(n-butylcyclopentadienyl)erbium (III). A particularly preferred rare earth element complex is tris(2,2,6,6-tetramethyl-3,5-hepeanedionato) erbium(III), which is also referred to as $Er^{+3}$ $(THMD)_3$.

When the rare earth element complex or the group IV semiconductor precursor are not volatile at room temperature, use can be made of a temperature-controlled oven 16 to bring the precursor or complex into the gaseous phase, the temperature controlled oven, which can be kept. E.g., between 110° C. and 120° C., controls the concentration of rare earth metal that is present in the gaseous phase. The temperature control oven can be fitted with a carrier gas inlet 26 to transfer the gaseous rare earth element complex to the furnace through the mass-flow controllers 18.

The ratio of the carrier gas, the group IV semiconductor precursor and the rare earth element complex is controlled by mass-flow controllers 18, which control the introduction of each gaseous component in the apparatus. The flow of the combined three mass-flow controllers is controlled to obtain a flow through the furnace that is preferably between 20 and 30 standard cubic centimetres per minute. The flow through the apparatus can be assisted with a mechanical vacuum pump 24 at the end of the gas pyrolysis apparatus.

Once introduced in the apparatus, the gaseous components flow into a short, temperature controlled furnace 20 (also referred to as a flow-through furnace). The flow-through furnace 20 is preferably a small tubular furnace having a length between 3 cm and 9 cm, the furnace being temperature controlled to be at a temperature where the gaseous group IV semiconductor precursor reacts to form nanocrystals. Temperatures of from 600° C. to 1000° C. have been found to be suitable for carrying out this reaction, although specific temperatures, which may be within or outside of this range, can be determined by non-inventive experimentation. Heating of the furnace can be carried out by any suitable method, such as electric heating or microwave heating. The tubular furnace can have an inside diameter that ranges, for example, from 6 to 20 mm, with an inside diameter of 12 mm being preferred. Selection of the length of the furnace, its inside diameter and the furnace temperature can be used to control the size of the nanocrystals obtained, as these parameters control the thermodynamics of the system. The parameters can be monitored so as to permit computer control of the gas pyrolysis process.

As the group IV semiconductor precursor ants the rare earth element complex are heated in the furnace, the group IV semiconductor precursor forms semiconductor nanocrystals, and the rare earth element complex deposits on the surface of the nanocrystals when the gaseous stream is cooled. The deposited rare earth element complex is preferably not part of the of the nanocrystals. The organic components are preferably transformed into gaseous by-products that are removed along with the carrier gas.

The gaseous stream containing the doped semiconductor nanocrystals can be allowed to cool within a cooling zone (not shown). The cooling zone can be from 10 cm to a few meters, and active cooling methods, such as mechanical refrigeration, an acetone/dry ice environment or a liquid nitrogen environment can be utilised.

The prepared doped semiconductor nanocrystals are then recovered from the carrier gas, for example by passing the carrier gas through one or more bubblers 22 that contain a solvent, such as ethylene glycol, in which the doped semiconductor nanocrystals display some solubility. The solvent can then removed from the bubblers and is vacuum dried to recover the doped type IV semiconductor nanocrystals.

Solution Saturation

A second method for preparing the doped semiconductor powder of the invention uses solution oversaturation of the rare earth element to deposit the rare earth element onto the nanocrystal surface. In this method, a solution comprising an undoped group IV semiconductor nanocrystal powder, a rare earth element complex and a solvent which is a good solvent for the rare earth element complex and a poor solvent for the undoped group IV semiconductor nanocrystal powder is heated to dissolve the rare earth element complex. Upon cooling of the solution, the solution becomes oversaturated with the rare earth element complex and the complex precipitates from solution to be deposited on the surface of the group IV semiconductor nanocrystals.

By "good solvent" is meant a solvent in which the rare earth complex is poorly soluble at low temperature, e.g. room temperature, but in which the rare earth complex is well dissolved at higher temperature. By "poor" solvent is meant a solvent in which the undoped group IV semiconductor nanocrystal powder displays little or no solubility, at both low and high temperatures. Examples of suitable solvent include ethanol, ethylene glycol, toluene, and benzene.

The first step of this process requires the preparation of an undoped group IV semiconductor nanocrystal powder, which preparation can be effected, for example, by (A) solution chemistry or (B) gas pyrolysis.

(A) Solution Chemistry

In the solution chemistry process, two complementary semiconductor complexes are combined to form the semiconductor nanocrystal and a salt, which nanocrystal and salt are subsequently separated. The undoped semiconductor nanocrystals are prepared by mixing a group IV semiconductor salt, such as a magnesium, sodium or iodine salt of silicon or germanium, with a halogenated group IV semiconductor compound such as silicon or germanium tetrachloride. The mixture is solubilised in a suitable solvent, for example ethylene glycol or hexane, and the mixture is refluxed. Filtration or centrifugation can be used to remove any insoluble salts formed, and the semiconductor nanocrystals are formed upon cooling of the solution.

The process for preparing the undoped semiconductor nanocrystal is preferably carried out in an inert atmosphere, and the reaction vessel used must be inert to the presence of silicon, such as a Teflon vessel, or a silonated glass vessel.

(B) Gas Pyrolysis

The gas pyrolysis process used to prepare the undoped group IV semiconductor nanocrystal powder is similar to the gas pyrolysis process described above for preparing doped semiconductor powders, but where the gaseous rare earth element complex is omitted.

Preparation of the doped type IV semiconductor nanocrystals is achieved by mixing undoped nanocrystals and a rare earth complex in a solvent which is a good solvent for the rare earth complex and a poor solvent for the type IV semiconductor nanocrystals, for example ethanol. Suitable rare earth complexes include, for example, erbium acetate hydrate and erbium (III) acetylacetonate hydrate. The heterogeneous mixture can be refluxed, for example, for about 90 to about 180 minutes, after which time the solution is cooled to obtain the doped nanocrystals. As the solution cools, the rare earth element complex precipitates out of solution and it deposits on the surface of the nanocrystals in the solution. The rare earth element that is deposited on the surface of the nanocrystal is in the form of a rare earth element complex.

Materials Comprising Doped Semiconductor Powders

An important advantage of the doped semiconductor powder over the doped layers traditionally prepared is that the doped semiconductor powder above, can be incorporated into a variety of different hosts, and that these hosts; can represent a liquid or a solid phase. The host or matrix is preferably chosen so that it does not interfere with the photoluminescence of the doped nanocrystals.

Examples of a suitable host or support matrix for the doped semiconductor powders of the invention include, for example, polymers, silica sol-gels, and spin-on-glass (SOG). Spin-on-glass can be comprised, for example, of a mixture of silicates that are dissolved in alcohol. Examples of suitable polymers include, for example, poly(2-methoxy-5-(2-ethylhexyloxy)-1,4-phenylene-vinylene) (PPV), polymethylmethacrylate (PMMA), and polyphenylene ether (PTE). When the host or support matrix is in a liquid or semi-liquid state, the doped semiconductor powder can be formed into specific shapes or patterns. These specific shapes can include layers that are prepared by spin-coating a liquid solution comprising the doped semiconductor powder. Patterns can also be prepared by combining a liquid polymer comprising the doped semiconductor powder with printing technology such as ink jet technology.

Another advantage of the doped semiconductor powder over the doped layers rests in the fact that they can be used to prepare thicker layers. It also allows the combination of different nanocrystal types to form hybrid systems, such as $Si_{nc}$+PbS or $Si_{nc}$+CdS.

The materials comprising doped semiconductor powders of the invention also have the advantage that the components of the materials, such as the host or support matrix, and any additional components such as a base substrate, are not required to be resistant to high temperatures. In traditional doped layer processes, the nanocrystals are formed by the high temperature annealing of amorphous silicon clusters, which requires that the other components present during annealing, such as the substrates, be temperature resistant. Components that are not temperature resistant can be used with the doped semiconductor powders of the invention, as the nanocrystals are formed prior to being incorporated in the materials.

However, when the components used to prepare the materials comprising semiconductor nanocrystal powders are temperature resistant, the materials can be subsequently annealed. This can prove beneficial for the preparation, for example, of semiconductor layers comprising semiconductor nanocrystals and a rare earth element. For example, a doped semiconductor powder of the invention can be incorporated into a silica sol-gel, which silica sol-gel is then formed into a layer. Annealing the sol-gel/nanocrystal powder mixture leads to the removal of the organic components of the mixture, leaving a silicon oxide layer in which the doped semiconductor nanocrystal powder is dispersed. Annealing can be carried out, for example, in a Rapid Thermal Anneal (RTA) furnace at from about 600° C. to about 1000° C. The annealing process; can be carried out under an oxygen atmosphere to insure the removal of the organic components, and to promote the oxidation of the rare earth element. The annealing step can also be carried out under a reduced pressure in order to facilitate the removal of any volatile organic by-products that might be produced.

Examples of devices that can be prepared with the materials comprising doped semiconductor powders include, for example, optical amplifiers, lasers, optical displays, optical planar circuits, and organic light emitting diodes (OLED).

The following examples are offered by way of illustration and not by way of limitation.

EXAMPLES

Example 1

A gas pyrolysis apparatus was fitted with a small tubular furnace having a length of 3 cm and an interior diameter of 12 mm. While the furnace temperature was held between 900 and 950° C., an argon carrier gas, silane ($SiH_4$), and $Er^{+3}$ $(THMD)_3$ were introduced to the furnace by way of precision mass-flow controllers. The $Er^{+3}$ $(THMD)_3$ was transferred to the gaseous phase through the use of a temperature controlled oven. The flow through the apparatus was assisted by a mechanical vacuum pump at the end of the apparatus. Once through the furnace, the gaseous stream was allowed to pass through a cooling zone and then to pass through a two-stage bubbler of ethylene glycol. The ethylene glycol solution was removed from the bubbler and it was vacuum dried to recover Er doped Si nanocrystals having an average diameter of about 3 nm.

Example 2

A doped semiconductor powder was prepared through a saturated solution process. The process was carried out in an inert atmosphere glove box, and the glassware used was first silonated by washing for one hour in a 2% toluene solution of $(CH_3)_2SiCl_2$, followed by repeated washes with hexane and methanol.

400 mg of magnesium silicide (MgSi) was added to 100 ml of dried ethylene glycol, stirred and refluxed for 12 hours in a glove box. 3 ml of $SiCl_4$ was added, and the mixture was again refluxed for another 12 hours. After this time, the mixture was filtered, cooled and dried under vacuum. 100 ml of ethanol was added to the dried Si nanocrystals, and 230 mg of dehydratated erbium acetate was added to the solution while stirring, followed by a 3 hour reflux. Upon cooling, the Er doped Si nanocrystals were obtained.

Numerous modifications and variations of the present invention are possible in light of the above teachings. It is therefore to be understood that within the scope of the appended claims, the invention may be practised otherwise than as specifically described herein.

All publications, patents and patent applications cited in this specification are herein incorporated by reference as if each individual publication, patent or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

It must be noted that as used in this specification and the appended claims, the singular forms "a", "an", and "the" include plural reference unless the context clearly dictates otherwise. Unless defined otherwise all technical and scientific terms used herein have the same meaning as commonly understood to one of ordinary skill in the art to which this invention belongs.

We claim:

1. A doped semiconductor powder comprising nanocrystals of a group IV semiconductor and a rare earth element, the rare earth element being dispersed on the surface of the group IV semiconductor nanocrystals.

2. A doped semiconductor powder according to claim 1, wherein the rare earth element is present in a concentration of front 0.5 to 10 atomic percent.

3. A doped semiconductor powder according to claim 1, wherein the rare earth element is present in a concentration of from 0.5 to 5 atomic percent.

4. A doped semiconductor powder according to claim 1, wherein the rare earth element is present in a concentration of from 0.5 to 2 atomic percent.

5. A doped semiconductor powder according to claim 1, wherein the nanocrystals have an average diameter of from 0.5 to 10 nm.

6. A doped semiconductor powder according to claim 1, wherein the nanocrystals have an average diameter of about 3 nm.

7. A doped semiconductor powder according to claim 1, wherein the group IV semiconductor is selected from Si, Ge, Sn and Pb.

8. A doped semiconductor powder according to claim 1, wherein the rare earth element is selected from cerium, praseodymium, neodymium, promethium, gadolinium, erbium, thulium, ytterbium, samarium, dysprosium, terbium, europium, holmium, lutetium, and thorium.

9. A doped semiconductor powder according to claim 1, wherein the rare earth element is selected from erbium, thulium and europium.

10. A group IV semiconductor nanocrystal powder according to claim 1, wherein the rare earth element is in the form of an oxide.

11. A composite material comprising a support matrix and a doped semiconductor powder according to claim 1, the doped semiconductor powder being coated on or embedded in the support matrix.

12. A composite material according to claim 11, wherein the doped semiconductor powder is embedded in the support matrix.

13. A composite material according to claim 11, wherein the support matrix comprises spin-on-glass, a silica sol-gel or a polymer.

14. A composite material according to claim 11, wherein the support matrix is in the form of a layer prepared by spin-coating.

15. A composite material according to claim 11, wherein the support matrix comprises silicon dioxide obtained by annealing a silica sol-gel.

16. A composite material according to claim 11, wherein the support matrix is in the form of a printed pattern.

* * * * *